United States Patent
Fontenelle et al.

(10) Patent No.: US 10,053,621 B2
(45) Date of Patent: Aug. 21, 2018

(54) METHODS FOR INCREASING THE SURFACE AREA OF FRACTURES OR TO INCREASE THE DEPTH OF PENETRATION FRACTURES IN LOW PERMEABILITY OIL AND GAS RESERVOIRS CONTAINING SHALE TO INCREASE PRODUCTIVITY

(71) Applicant: HALLIBURTON ENERGY SERVICES, INC., Houston, TX (US)

(72) Inventors: Lucas Fontenelle, Houston, TX (US); Enrique Antonio Reyes, Tomball, TX (US); Eli Allen Schnoor, Kingwood, TX (US); Dandan Hu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/323,090

(22) PCT Filed: Jul. 18, 2014

(86) PCT No.: PCT/US2014/047137
§ 371 (c)(1),
(2) Date: Dec. 29, 2016

(87) PCT Pub. No.: WO2016/010548
PCT Pub. Date: Jan. 21, 2016

(65) Prior Publication Data
US 2017/0145303 A1    May 25, 2017

(51) Int. Cl.
*E21B 43/26* (2006.01)
*E21B 43/22* (2006.01)
(Continued)

(52) U.S. Cl.
CPC ............... *C09K 8/92* (2013.01); *C09K 8/725* (2013.01); *E21B 43/25* (2013.01); *E21B 43/26* (2013.01); *E21B 43/267* (2013.01)

(58) Field of Classification Search
CPC .......... C09K 8/92; C09K 8/725; C09K 8/685; E21B 43/267; E21B 33/1208; E21B 43/25; E21B 43/26
See application file for complete search history.

(56) References Cited

U.S. PATENT DOCUMENTS

| 5,373,901 A | 12/1994 | Norman et al. |
| 6,207,620 B1 | 3/2001 | Gonzalez et al. |

(Continued)

FOREIGN PATENT DOCUMENTS

EP    1333152    8/2003

OTHER PUBLICATIONS

PCT International Search Report and Written Opinion, dated Mar. 27, 2015, Appl No. PCT/US2014/047137, "Methods for Increasing the Surface area of fractures in low permeability oil and gas reservoirs containing shale to increase productivity," Date Filed Jul. 18, 2014, 10 pgs.

*Primary Examiner* — Zakiya W Bates
(74) *Attorney, Agent, or Firm* — Craig Roddy Tumey L.L.P.

(57) ABSTRACT

A method of treating a subterranean formation includes providing capsules comprising at least one of a mineral acid, a Lewis acid, a hydrolysable acid precursor, and mixtures thereof; providing a carrier fluid; placing the capsules and the carrier fluid into a zone in a shale formation, the zone comprising fractures; allowing the capsules to at least partially dissolve. Upon the hydrolysis of the acid, etching of the faces of the fractures occurs.

16 Claims, 7 Drawing Sheets

(51) Int. Cl.
*C09K 8/92* (2006.01)
*C09K 8/72* (2006.01)
*E21B 43/25* (2006.01)
*E21B 43/267* (2006.01)

(56) References Cited

U.S. PATENT DOCUMENTS

| | | |
|---|---|---|
| 6,357,527 B1 | 3/2002 | Norman et al. |
| 2003/0196808 A1 | 10/2003 | Blauch et al. |
| 2003/0234103 A1 | 12/2003 | Lee et al. |
| 2007/0123433 A1 | 5/2007 | Sarkar et al. |
| 2007/0173416 A1 | 7/2007 | Moorehead et al. |
| 2015/0337638 A1* | 11/2015 | Lawrence ............... C09K 8/80 166/300 |
| 2015/0375234 A1* | 12/2015 | McClung, III ........... C09K 8/03 241/1 |
| 2016/0017215 A1* | 1/2016 | Al-Muntasheri ...... C09K 8/882 166/307 |

* cited by examiner

METHODS FOR INCREASING THE SURFACE AREA OF FRACTURES OR TO INCREASE THE DEPTH OF PENETRATION FRACTURES IN LOW PERMEABILITY OIL AND GAS RESERVOIRS CONTAINING SHALE TO INCREASE PRODUCTIVITY

BACKGROUND

The present invention generally relates to the use fracturing etching treatment fluids in subterranean operations, and, more specifically, to the use of acidic treatment fluids comprising encapsulated acids and acid precursors, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Oil or gas residing in the subterranean formation may be recovered by stimulation treatments, which fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

A widely used stimulation technique is acidizing, in which a treatment fluid including an aqueous acid solution is introduced into the formation to dissolve acid-soluble materials. In this way, hydrocarbon fluids can more easily flow from the formation into the well. In addition, an acid treatment can facilitate the flow of injected treatment fluids from the well into the formation. Acidizing techniques can be carried out as matrix acidizing procedures or as acid fracturing procedures. In matrix acidizing, an acidizing fluid is injected from the well into the formation at a rate and pressure below the pressure sufficient to create a fracture in the formation. In sandstone formations, the acid primarily removes or dissolves acid soluble damage in the near wellbore region and is thus classically considered a damage removal technique and not a stimulation technique. In carbonate formations, the goal is to actually a stimulation treatment where in the acid forms conducted channels called wormholes in the formation rock. In acid fracturing, an acidizing fluid is pumped into a carbonate formation at a sufficient pressure to cause fracturing of the formation and creating differential (non-uniform) etching fracture conductivity.

Conventional acid fracturing does not provide an effective means for etching the fracture faces since most of the activity of the acid or chelating agent is consumed by the time it reaches the target area. Also, the current use of liquid acid tends to cover or distribute over the broad surface of the fracture face, thus diminishing its effectiveness of clay solids dissolving ability.

Accordingly, an ongoing need exists for methods of etching the fracture faces of fractures in shale formations to enhance production without the use of a propping agent.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

This invention describes the use of delayed action chemicals that increase the degradation of minerals and chemical species that were injected into a reservoir during the stimulation process. Methods of the invention may be used to treat a low porosity shale formation. The method may include injecting a delayed release acid or oxidizer as part of the proppant pack that upon release the acid or oxidizer will continue to react with the formation minerals and injected materials. In the case of an oxidizer, the invention may continue to degrade materials such as gelling agents that are not effectively degraded by the amount of viscosity reduction agents needed to meet the specification of the fluid design. Additionally in the case where delayed acid is used, upon release, the acid may etch the surface of the contact of the formation, increasing the permeability of the formation. This process is intended for use in regions away from the well bore, where it can help increase the surface area of the stimulated zone, aid in widening of primary fractures, or in some cases help to initiate secondary fractures by generating localized wormholes.

Tight gas and shale formations typically display very low porosity and permeability—typically less than 1 millidarcy. These properties limit the ability of penetration of treatment fluid into the formation, and conversely, hydrocarbon out of the rock. In many cases fracturing stimulation is required for increasing the porosity of shale formations, and propagation of fractures is limited to the type of fluid and the energy imparted by the fluid upon treatment. Additional chemical degradation of propagated fractures can enhance the porosity and permeability of shales by elongating the fractures that are not simulated by hydraulic energy.

In some embodiments of the present invention, a method of treating a wellbore in a subterranean formation includes: providing capsules comprising at least one of a mineral acid, a Lewis acid, a hydrolysable acid precursor, and mixtures thereof; providing a carrier fluid; placing the capsules and the carrier fluid into a zone in a shale formation, said zone comprising fractures; allowing the capsules to at least partially dissolve; allowing the at least one of acid, Lewis acid, and hydrolysable acid precursor to hydrolyze; and etching the faces of at least one of fractures. The etching may result in the formation of at least one of channels, gaps, or combinations thereof, between the fracture faces. The hydrolysable acid precursor may be selected from titanium chloride, zirconium oxychloride, ammonium chloride, ammonium fluoride, trifluoromethanesulfonic acid, Faujasite zeolite, and combinations thereof, and preferably disodium titanium chloride. The Lewis acid may be selected from $BF_3$, $AlCl_3$, $FeCl_2$, $MgCl_2$, $ZnCl_2$, $SnCl_2$, and $CuCl_2$, and combinations thereof. The mineral acid may include at least one of hydrochloric acid, nitric acid, sulfuric acid, phosphoric acid, boric acid, hydrofluoric acid, hydrobromic acid, perchloric acid, and combinations thereof. The capsule may include a water soluble degradable polymer to encapsulate at least one of said mineral acid, Lewis acid, hydrolysable acid precursor, and mixtures thereof. Degradable polymers may include at least one selected from phenyl formaldehyde, lactone styrene derivatives, precipitated silica, elastomers, polyvinylidene chloride (PVDC), nylon, waxes, polyurethanes, cross-linked partially hydrolyzed acrylics, and combinations thereof. The capsules may encapsulate the at least one of acid, Lewis acid, and hydrolysable acid precursor in a degradable material. Degradable materials may include a hydrolysable material that delays the hydrolyzing of the at least one of acid, Lewis acid, and hydrolysable acid precursor.

In various embodiments, a method includes: hydraulically fracturing a subterranean formation to produce a fractured formation having at least one fracture face; injecting capsules comprising at least one of a mineral acid, a Lewis acid, a hydrolysable acid precursor, and mixtures thereof into said fractured formation while maintaining hydraulic pressure on said fractured formation; depositing said capsules in said fractured formation; allowing at least a portion of the capsules to degrade or fracture, thereby releasing at least one of said mineral acid, Lewis acid, hydrolysable acid precursor, and mixtures thereof from said capsules; and allowing at least one of said mineral acid, Lewis acid, hydrolysable acid precursor, and mixtures thereof to hydrolyze, thereby acid etching said fracture face. The etching may result in the formation of at least one of channels, gaps, or combinations thereof, between the fracture faces. The hydrolysable acid precursor may be selected from titanium chloride, zirconium oxychloride, ammonium chloride, ammonium fluoride, trifluoromethanesulfonic acid, Faujasite zeolite, and combinations thereof, and preferably disodium titanium chloride. The Lewis acid may be selected from $BF_3$, $AlCl_3$, $FeCl_2$, $MgCl_2$, $ZnCl_2$, $SnCl_2$, and $CuCl_2$, and combinations thereof. The mineral acid may include at least one of hydrochloric acid, nitric acid, sulfuric acid, phosphoric acid, boric acid, hydrofluoric acid, hydrobromic acid, perchloric acid, and combinations thereof. The capsule may include a water soluble degradable polymer to encapsulate at least one of said mineral acid, Lewis acid, hydrolysable acid precursor, and mixtures thereof. Degradable polymers may include at least one selected from phenyl formaldehyde, lactone styrene derivatives, precipitated silica, elastomers, polyvinylidene chloride (PVDC), nylon, waxes, polyurethanes, cross-linked partially hydrolyzed acrylics, and combinations thereof. The capsules may encapsulate the at least one of acid, Lewis acid, and hydrolysable acid precursor in a degradable material. Degradable materials may include a hydrolysable material that delays the hydrolyzing of the at least one of acid, Lewis acid, and hydrolysable acid precursor.

In some embodiments, a method of treating a wellbore in a subterranean formation includes: providing an insoluble matrix comprising at least one of a mineral acid, a Lewis acid, a hydrolysable acid precursor, and mixtures thereof; providing a carrier fluid; placing the matrix and the carrier fluid into a zone in a shale formation, said zone comprising fractures; allowing the matrix to at least partially degrade; allowing the at least one of acid, Lewis acid, and hydrolysable acid precursor to hydrolyze; and etching the faces of at least one of fractures. The etching may result in the formation of at least one of channels, gaps, or combinations thereof, between the fracture faces. The hydrolysable acid precursor may be selected from titanium chloride, zirconium oxychloride, ammonium chloride, ammonium fluoride, trifluoromethanesulfonic acid, Faujasite zeolite, and combinations thereof, and preferably disodium titanium chloride. The Lewis acid may be selected from $BF_3$, $AlCl_3$, $FeCl_2$, $MgCl_2$, $ZnCl_2$, $SnCl_2$, and $CuCl_2$, and combinations thereof. The mineral acid may include at least one of hydrochloric acid, nitric acid, sulfuric acid, phosphoric acid, boric acid, hydrofluoric acid, hydrobromic acid, perchloric acid, and combinations thereof. The insoluble matrix may include a water soluble degradable polymer to encapsulate at least one of said mineral acid, Lewis acid, hydrolysable acid precursor, and mixtures thereof. Insoluble matrix materials may include at least one of polylactic acid, polyglycolic acid, poly(hydroxy alkanoate) (PHA); poly(alpha-hydroxy) acids, polylactide, and polyglycolide; poly(beta-hydroxy alkanoates); poly(omega-hydroxy alkanoates); poly(alkylene dicarboxylates), polyanhydrides; poly(orthoesters); polycarbonates; aliphatic polyesters; poly(lactides); poly(glycolides); poly($\varepsilon$-caprolactones); poly(hydroxybutyrates); poly(an hydrides); aliphatic polycarbonates; poly(orthoesters); poly(amino acids); poly(ethylene oxides); polyphosphazenes, and mixtures thereof that incorporates the at least one of said mineral acid, Lewis acid, and hydrolysable acid precursor. The matrix may degrade due to closure pressure in the formation, thereby gradually releasing the at least one of said mineral acid, Lewis acid, and hydrolysable acid precursor into the zone.

A further embodiment includes a well treatment system comprising: a well treatment apparatus configured to: inject capsules comprising at least one of a mineral acid, a Lewis acid, a hydrolysable acid precursor, and mixtures thereof into a fractured subterranean formation while maintaining hydraulic pressure on said fractured formation; deposit said capsules in said fractured formation; allow at least a portion of the capsules to degrade or fracture, thereby releasing at least one of said mineral acid, Lewis acid, hydrolysable acid precursor, and mixtures thereof from said capsules; and allowing at least one of said mineral acid, Lewis acid, hydrolysable acid precursor, and mixtures thereof to hydrolyze, thereby acid etching said fracture face. The etching may result in the formation of at least one of channels, gaps, or combinations thereof, between the fracture faces. The hydrolysable acid precursor may be selected from titanium chloride, zirconium oxychloride, ammonium chloride, ammonium fluoride, trifluoromethanesulfonic acid, Faujasite zeolite, and combinations thereof, and preferably disodium titanium chloride. The Lewis acid may be selected from $BF_3$, $AlCl_3$, $FeCl_2$, $MgCl_2$, $ZnCl_2$, $SnCl_2$, and $CuCl_2$, and combinations thereof. The mineral acid may include at least one of hydrochloric acid, nitric acid, sulfuric acid, phosphoric acid, boric acid, hydrofluoric acid, hydrobromic acid, perchloric acid, and combinations thereof. The capsule may include a water soluble degradable polymer to encapsulate at least one of said mineral acid, Lewis acid, hydrolysable acid precursor, and mixtures thereof. Degradable polymers may include at least one selected from phenyl formaldehyde, lactone styrene derivatives, precipitated silica, elastomers, polyvinylidene chloride (PVDC), nylon, waxes, polyurethanes, cross-linked partially hydrolyzed acrylics, and combinations thereof. The capsules may encapsulate the at least one of acid, Lewis acid, and hydrolysable acid precursor in a degradable material. Degradable materials may include a hydrolysable material that delays the hydrolyzing of the at least one of acid, Lewis acid, and hydrolysable acid precursor.

One of the advantages of the present invention is that one may tailor the rate of the hydrolyzing of the capsules or matrix structures to the actual well conditions. This may occur by changing the composition of the carrier fluid, the encapsulation material, or the matrix material. Other advantages may be evident to one skilled in the art.

Before hydrolysis occurs, the treatment fluids of the present invention may comprise a carrier fluid and a hydrolysable acid precursor. After the hydrolysis of the acid precursor, a treatment fluid in accordance with the present invention may comprise a carrier fluid and an acid.

Carrier Fluids

Carrier fluids may be used to deliver the encapsulated mineral acid, Lewis acid, hydrolysable acid precursor, and mixtures into a wellbore. The carrier fluid that is used to deposit the capsules in the fracture may be the same fluid that is used in a fracturing operation or may be a second fluid that is introduced into the well after the fracturing fluid is introduced. The carrier fluids may include non-aqueous base fluids, aqueous base fluids and combinations thereof.

Non-Aqueous Base Fluids

In exemplary embodiments, non-aqueous base fluids may be used in the carrier fluids. Examples of non-aqueous fluids include alcohols such as methanol, ethanol, isopropanol, and other branched and linear alkyl alcohols; diesel; paraffinic solvent; raw crude oils; condensates of raw crude oils; refined hydrocarbons such as naphthalenes, xylenes, toluene and toluene derivatives, hexanes, pentanes; and combinations thereof. In some embodiments, the non-aqueous carrier fluid is present in the treatment fluid the amount of from about 0.1% to about 50% by volume of the treatment fluid, preferably from about 1% to about 25%.

Aqueous Base Fluids

The aqueous base fluid of the present embodiments can generally be from any source, provided that the fluids do not contain components that might adversely affect the stability and/or performance of the treatment fluids of the present invention. The aqueous carrier fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

The aqueous carrier fluid may be present in the treatment fluid in the amount of from about 85% to about 98% by volume of the treatment fluid, about 90% to about 98%, or about 94% to about 98%. When the solubility of the polyvalent metal salt of carboxylic acid, the water-soluble polymerization initiator, or other components that may be added to the fluids described herein are low, a solvent may optionally be included with the aqueous base fluid so as to aid in solubility and/or polymerization and curing of the polyvalent metal salt of carboxylic acid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. For purposes of this disclosure, a material is considered as water-soluble if the solubility of the material in water at room temperature is 5% or higher.

Acids

The acids used in the present invention may be any mineral acid, Lewis acid, or acid precursor that facilitates the desired controlled degradation or hydrolysis of a proppant pack under the conditions in which the pack is employed. The acids may also etch the faces of fractures. Typically, the acids may provide a pH of about 3 or less in the fluids or environment surrounding the proppant pack or fracture faces, preferably about 2.5 or less. The acid concentration, when in place, may be in the range of about 5% to about 20% by weight of the treatment fluid, or a concentration such that the action of the acids on the formation is effective Hydrolysable Acid Precursors The treatment fluids of the present invention may also include encapsulated hydrolysable acid precursors. These acid precursors may include titanium chloride, zirconium oxychloride, ammonium chloride, ammonium fluoride, trifluoromethanesulfonic acid, Faujasite zeolite, and combinations thereof, and preferably disodium titanium chloride, trifluoromethanesulfonic acid, or Faujasite zeolite. An appropriate amount of the acid precursor portion of the encapsulated hydrolysable acid precursor present in the treatment fluids may be from about 1 wt. % to about 30 wt. %, alternatively, about 5 wt. % to about 20 wt. % alternatively about 10 wt. % to about 15 wt. % based on weight of carrier fluid used in the treatment fluid.

Mineral Acids and Lewis Acids

Mineral acids form hydrogen ions and the conjugate base ions when dissolved in water and are derived from one or more inorganic compounds. The encapsulated mineral acids of the present invention may be selected from the group consisting of hydrochloric acid, nitric acid, sulfuric acid, phosphoric acid, boric acid, hydrofluoric acid, hydrobromic acid, perchloric acid and mixtures thereof.

A Lewis acid is a molecular entity (and the corresponding chemical species) that is an electron-pair acceptor and therefore able to react with a Lewis base to form a Lewis adduct, by sharing the electron pair furnished by the Lewis base. Lewis acids are electron deficient molecules which tend to increase the concentration of $H^+$ or the acidity of a solution. Encapsulated Lewis acids of the present invention may include $BF_3$, $AlCl_3$, $FeCl_2$, $MgCl_2$, $ZnCl_2$, $SnCl_2$, $CuCl_2$ trifluoromethanesulfonic acid, Faujasite zeolite and combinations thereof.

An appropriate amount of the mineral acid or Lewis acid portion of the encapsulated acids present in the treatment fluids may be from about 1 wt. % to about 30 wt. %, alternatively, about 5 wt. % to about 20 wt. % alternatively about 10 wt. % to about 15 wt. % based on weight of carrier fluid used in the treatment fluid.

Encapsulating Compounds

In the present invention, mineral acids, Lewis acids, and hydrolysable acid precursors may be encapsulated in a hydrolysable material. The encapsulated hydrolysable material may form a capsule. Compounds comprising a mineral acid, a Lewis acid, a hydrolysable acid precursor suitable for use in the present invention may be at least partially coated or encapsulated with slowly water soluble or other similar encapsulating materials. Such materials are well known to those skilled in the art. Examples of water-soluble and other similar encapsulating materials that can be utilized include, but are not limited to, porous solid materials such as precipitated silica, elastomers, polyvinylidene chloride (PVDC), nylon, waxes, polyurethanes, cross-linked partially hydrolyzed acrylics, and the like. Suitable materials may also include phenyl formaldehyde, lactone styrene derivatives, and combinations thereof. Using encapsulated well treatment chemicals permits blending of normally incompatible compounds in the treatment fluid. As a non-limiting example, the present invention permits the transport of the hydrolysable acid precursor to a downhole environment by a treatment fluid having a neutral or basic pH without detrimentally impacting either the treatment fluid or the hydrolysable acid precursor. A non-limiting list of mechanisms suitable for releasing the encapsulated mineral acid, Lewis acid, and hydrolysable acid precursor includes: a change in pH, crushing, rupture, dissolution of the membrane, diffusion and/or thermal melting of the encapsulating membrane. Following placement of the compounds downhole, the acid compounds are then released from the capsules and allowed to react. The controlled downhole release of the acid compounds will significantly improve their functionality.

Capsules of the present invention may have any shape, including but not limited to particles having the physical shape of rods, strips, spheroids, toroids, pellets, tablets, or any other physical shape. One of ordinary skill in the art with the benefit of this disclosure will recognize the specific degradable material and the preferred size and shape for a given application.

Particles

As used herein, a "particle" refers a body having a finite mass and sufficient cohesion such that it can be considered as an entity but having relatively small dimensions. As used herein, a particle can be of any size ranging from molecular scale particles to macroscopic particles, depending on context. A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions. Particulates as used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand). A particulate will have a particle size distribution ("PSD"). As used herein, "the size" of a particulate can be determined by methods known to persons skilled in the art.

Degradable Materials

The acids and acid precursors of the present invention may be incorporated into a matrix comprising degradable polymers. As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ.

The bridging in the proppant pack formed by a polymer matrix comprising a degradable material according to the present invention is preferably "self-degrading." As referred to herein, the term "self-degrading" means bridging may be removed without the need to circulate a separate "clean up" solution or "breaker" into the treatment zone, wherein such clean up solution or breaker having no purpose other than to degrade the bridging in the proppant pack. Though the bridging formed by the methods of the present invention constitute "self-degrading" bridging, an operator may nevertheless elect to circulate a separate clean up solution through the well bore and into the treatment zone under certain circumstances, such as when the operator desires to hasten the rate of degradation of the bridging in the proppant pack.

The terms "degradable" or "degradation" refer to both the two relatively extreme cases of degradation that the degradable material may undergo, that is, heterogeneous (or bulk erosion) and homogeneous (or surface erosion), and any stage of degradation in between these two. Preferably, the degradable material of the polymer matrix degrades slowly over time as opposed to instantaneously.

In general, selection of a degradable polymer matrix and fracturing fluid depends on a number of factors including: (1) the degradability of the material of the matrix; (2) the size of the matrix; (3) the pH of the fracturing fluid, if water-based; (4) the design temperature; and (5) the loading of the matrix in the fracturing fluid. The step of designing or determining a fracturing stage preferably includes selecting a suitable degradable polymer matrix and fracturing fluid for the fracturing stage.

The choice of degradable material for use in the degradable particulate can depend, at least in part, on the conditions of the well, e.g., wellbore temperature. For instance, lactides can be suitable for lower temperature wells, including those within the range of about 60° F. to about 150° F., and polylactides can be suitable for well bore temperatures above this range. Dehydrated salts may also be suitable for higher temperature wells.

Useful degradable polymers for the matrix of the present invention are considered to be "degradable" herein if the degradation is due to, inter alia, chemical or radical process such as hydrolysis, oxidation, enzymatic degradation, or UV radiation. The degradability of a polymer depends at least in part on its backbone structure. For instance, the presence of hydrolyzable or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Non-limiting examples of degradable materials that may be used in conjunction with the present invention include, but are not limited to aromatic polyesters and aliphatic polyesters. Such polyesters may be linear, graft, branched, crosslinked, block, dendritic, homopolymers, random, block, and star-—and hyper-branched aliphatic polyesters, etc. Some suitable polymers include poly(hydroxy alkanoate) (PHA); poly(alpha-hydroxy) acids such as polylactic acid (PLA), polygylcolic acid (PGA), polylactide, and polyglycolide; poly(beta-hydroxy alkanoates) such as poly(beta-hydroxy butyrate) (PHB) and poly(beta-hydroxybutyrates-co-beta-hydroxyvelerate) (PHBV); poly(omega-hydroxy alkanoates) such as poly(beta-propiolactone) (PPL) and poly($\varepsilon$-caprolactone) (PCL); poly(alkylene dicarboxylates) such as poly(ethylene succinate) (PES), poly(butylene succinate) (PBS); and poly(butylene succinate-co-butylene adipate); polyanhydrides such as poly(adipic anhydride); poly(orthoesters); polycarbonates such as poly(trimethylene carbonate); and poly(dioxepan-2-one)]; aliphatic polyesters; poly(lactides); poly(glycolides); poly($\varepsilon$-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Derivatives of the above materials may also be suitable, in particular, derivatives that have added functional groups that may help control degradation rates.

For the purposes of forming a suitable polymer matrix, the polymer (or oligomer) should have at least a sufficient degree of polymerization or level of plasticization to be a solid. Polycondensation reactions, ring-opening polymerizations, free radical polymerizations, anionic polymerizations, carbocationic polymerizations, coordinative ring-opening polymerization, and any other suitable process may prepare such suitable polymers. One of skill in the art will be able to adjust the composition of the polymer to achieve the desired degradation properties.

Employing an insoluble matrix is a means to extend the rate of release of acids from hours to days or further to months, depending on temperature. As the proppant is transported into the hydraulically created fractures and pumping operations have ceased, the increase in the changes in the permeability of the delayed coating allows for the release of the acid or oxidizing agent. The use of an insoluble matrix provides a delayed release acid, which is typically only attainable with the use of gelling agents or emulsions.

Formation Treatment

During a remedial or primary treatment, a proppant pack may be formed in a treatment zone before the fracturing stage of the process. A proppant pack may also be formed during the fracturing stage. If the proppant pack is formed before the fracturing stage, the treatment zone was previously fractured and a proppant pack was previously placed in the fracture complexity. Accordingly, the methods according to the invention can be adapted for remedial or primary fracturing of a treatment zone.

Fracturing Process

After blending into a carrier fluid, the capsules are injected downhole to a desired location in the well. Those skilled in the art of well treatment are familiar with the techniques used for injecting particulates and chemicals into the desired portion of a well. For example, a typical fracturing process first positions a spacer in the pipe string just below the fractured formation. After positioning of the spacer, fracturing fluid is pumped at fracturing rates into the target formation. The spacer acts to initiate the fracture by focusing fluid pressure on the desired formation. Following fracturing of the formation, acid etching of the fracture typically takes place. Thus, a carrier fluid containing the acid filled capsules would then be initiated to the well. During injection of the acid containing capsules, the hydraulic fracture will likely continue to grow. Preferably, the capsules will travel the length of the fracture. Leak off of the non-acid carrier fluid into the rock fractures and pores concentrates the capsules where they are needed for pinpoint reaction. In this manner, the reaction occurs where it is most needed.

A proppant pack may be formed during the fracturing stage, either before the introduction of the acid encapsulated capsules or simultaneously with the introduction of the capsules. For example, one of the earlier fracturing fluids used in a fracturing stage can include a proppant for forming a proppant pack in the fracture, and one of the later fracturing fluids used in the fracturing stage can include the acid encapsulated capsules as additional fracturing fluid is pumped into the formation.

A non-limiting list of mechanisms suitable for releasing the encapsulated fluid includes: a change in pH, crushing, rupture, dissolution of the semi-permeable membrane, diffusion and/or thermal melting of the encapsulating membrane. For example, acid etching of a fracture face typically follows formation fracturing. Preferably, the acid containing capsules will be injected into the formation with the fracturing fluid. This process places the acid in direct contact with the fracture face. Upon removal of hydraulic pressure from the fracture, the fracture will close and crush the capsules. The released acid reacts with the fracture face forming channels. These channels provide the passages necessary to increase the production of hydrocarbons from the producing formation. When thermal release of the fluid is desired, a fracture cool down model is prepared to design or predict thermal cool down effects and effective depth of transport prior to achieving thermal release of the liquid. In a diffusive release mode, plots of the fraction release vs. time provide the release rates needed to calculate pump rate, pump time or shut-in period to achieve the desired liquid release point.

Figure 6A:
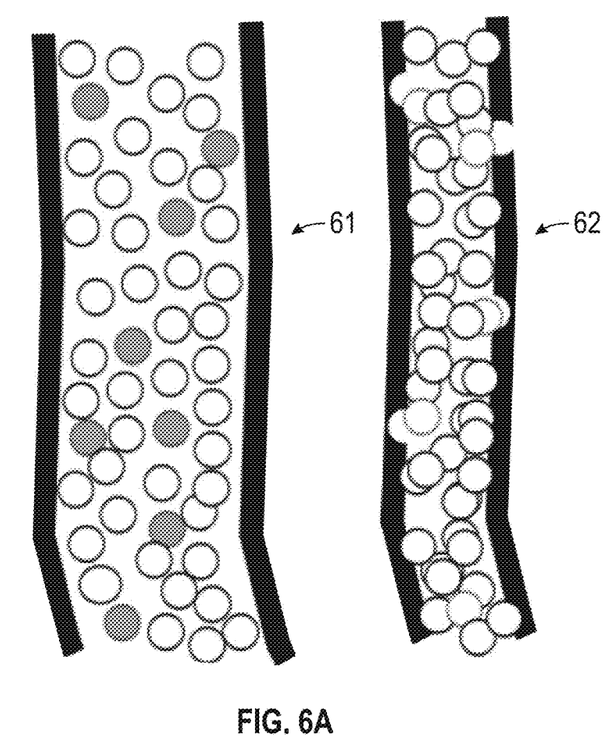
FIGS. 6A,B show diagrams of proppant pack within a fracture treated with concentrated acid packages.
Figure 6B:
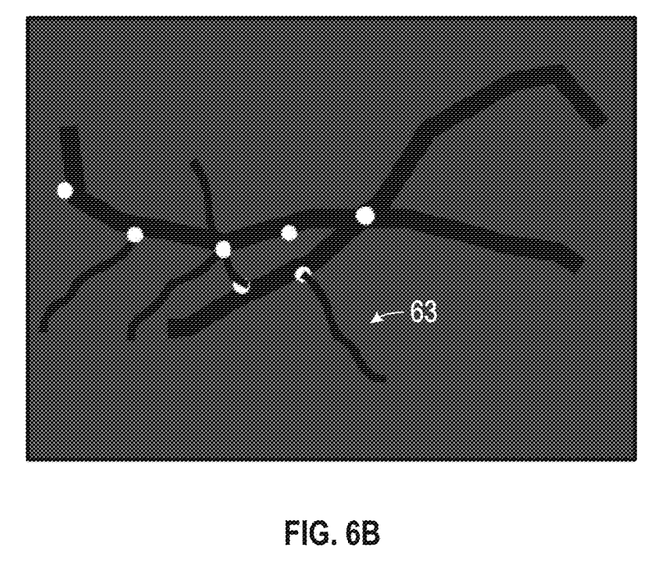

The reaction of the acid with the formation, leads to increased etching of the fracture surface, and additionally may produce worm holing on areas where the concentration of the acid is high enough, or there are secondary fissures or fractures in the reservoir surface. This leads to increasing the surface area of the primary fractures as well as the secondary fractures, leading to increased conductivity of the reservoir formation. FIGS. 6A,B show proppant pack within a fracture treated with concentrated acid packages 61. Upon fracture closure 62, the acid etches the surface of the fracture, and imbibes into secondary fractures 63 increasing their surface area.

Furthermore, the delayed acid releasing capsules or polymer matrix structures, upon reaction with soluble minerals in the formation, may create a by-product that can facilitate the mitigation or inhibition of fines produced during a fracturing process, otherwise known as fines. By increasing the surface area and depth of fractures, there is a higher probability that the rate of production of tight gas or shale formations can be increased over current methods.

Acid Etching Procedure

The method of injecting an acid containing capsule and acid etching a well fracture will be discussed to exemplify the current invention. While the following discussion focuses on acid etching, the method of injecting well treatment chemicals and additives is not limited to the injection of an acid. Acid etching a well fracture according to the current invention requires an acid encapsulated within a dissolvable capsule. The operator blends the encapsulated acid with the desired carrier fluid prior to injection downhole. If desired, surfactants may be added to aid in dispersing and carrying the capsules. Alternatively foamed or gelled fluids may also be used to transport capsules.

Due to the isolation of the acid from the carrier fluid, additional components may be added, as necessary, to ensure complete transport of the acid capsules through the length of the fracture to be acid etched. For example, addition of viscosity enhancers will increase the viscosity of the carrier fluid and will improve pumpability. Improved pumpability will promote transport of the capsules to the end of the fracture. Alternatively, the carrier fluid may also double as the fracturing fluid. In either case, despite the high concentration of acid dispersed therein, the carrier fluid will act as a non-acid and will generally have a pH between about 4 and about 11.5.

Following transport to the desired downhole location, the operator releases the acid from the capsules by any of several methods including but not limited to: releasing pressure on the fracture causing it to close and crush the capsule; dissolution of the capsule by other downhole chemicals; dissolution or rupture of the capsule due to a change in pH; changing the downhole static pressure leading to rupture of the capsule; and, melting of the capsule. Upon release, the acid will react with the fracture face to create additional channels and passages for oil production.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable stimulation treatments where a treatment fluid of the present invention may be suitable. Other potential applications of this resin system, with some minor adjustments such as modifying the dilution factor with the carrier fluid or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the treatment fluid is placed into a wellbore as a single stream and activated by downhole conditions to form new channels or gaps in fracture faces.

In an embodiment, the consolidation treatment fluid may be introduced into the wellbore, the formation, or a lost circulation zone as a single pill fluid. That is, in such an embodiment, all components of the treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

In an embodiment, the carrier liquid and entrained materials, including the acid contain capsules, are allowed to remain at rest under pressure until the consolidating material on the proppants consolidates to form a solid matrix in which the proppants and dissolvable materials are embedded thereby forming a porous, consolidated proppant pack.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Hydraulic fracturing, sometimes referred to as fracturing or fracing, is a common stimulation treatment. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation. In wells penetrating certain formations, it is often desirable to create relatively small fractures referred to in the art as "microfractures" in the formations near the wellbores to facilitate creation of hydraulically induced enlarged fractures.

The substance of a "gel" is a colloidal dispersion. A gel is formed by a network of interconnected molecules, such as of a crosslinked polymer or of micelles, which at the molecular level are attracted to molecules in liquid form. The network gives a gel phase its structure (apparent yield point) and contributes to stickiness (tack). By weight, the substance of gels is mostly liquid, yet they behave like solids due to the three-dimensional network with the liquid. At the molecular level, a gel is a dispersion in which the network of molecules is continuous and the liquid is discontinuous.

In various embodiments, systems configured for delivering the treatment fluids described herein to a downhole location are described. In various embodiments, the systems can comprise a pump fluidly coupled to a tubular, the tubular containing the hydrolysable acid, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for carrier downhole.

Figure 1:
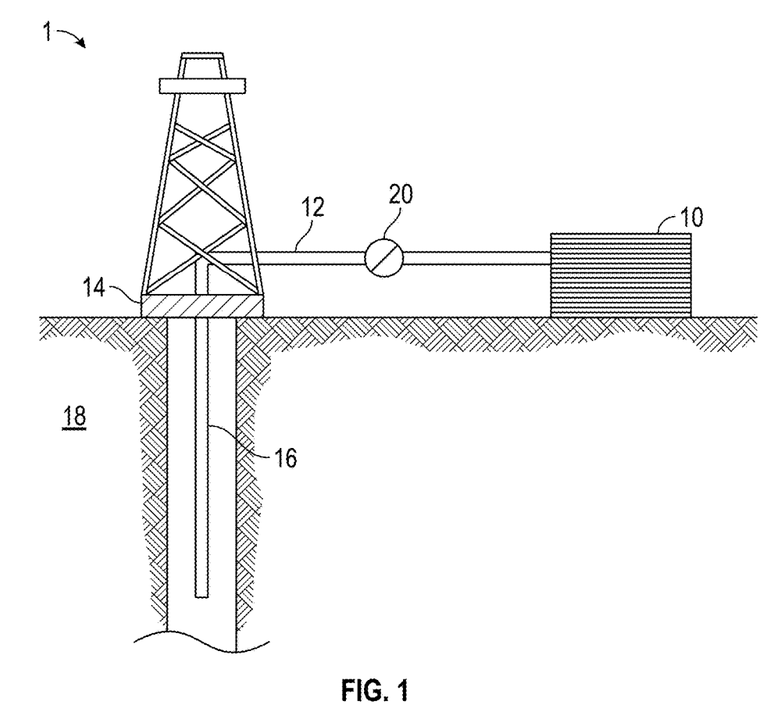
FIG. 1 depicts an embodiment of a system configured for delivering the encapsulated acid compositions comprising treatment fluids of the embodiments described herein to a downhole location.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Experiments

Figure 2A:
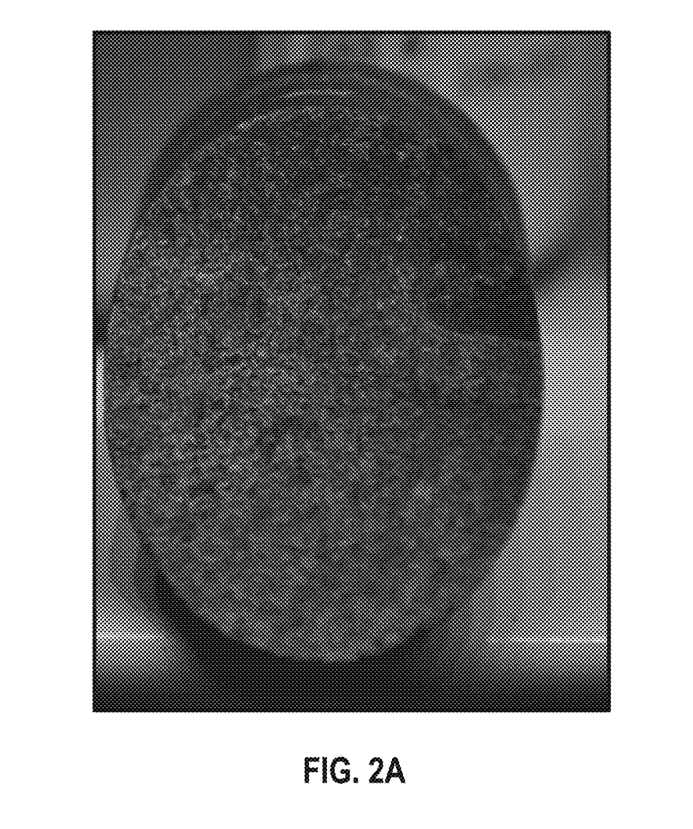
FIGS. 2A,B show images of the internal portions of fractured cores before and after treatment with $AlCl_3$.
Figure 2B:
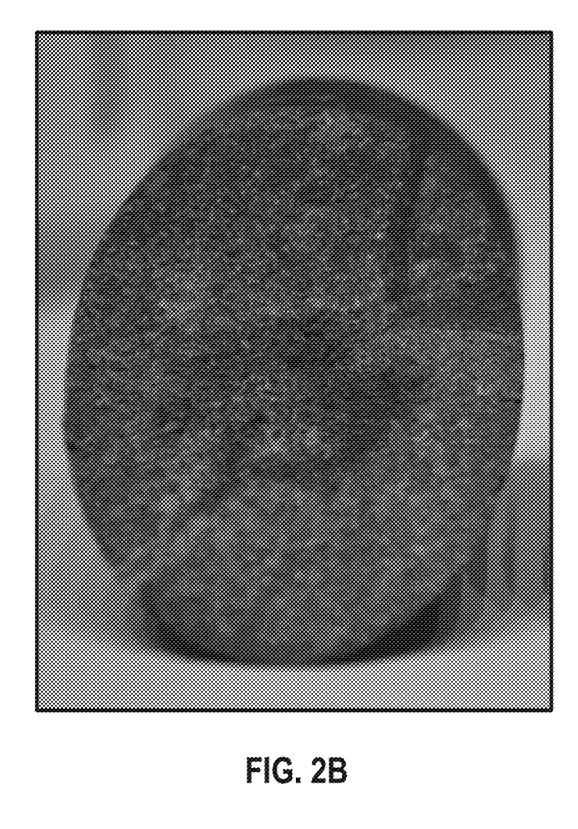

Cylindrical shale cores with dimensions of 1 inch wide by 2 inches tall were obtained after they were broken into two or more pieces. Core samples were only used which contained pieces which fit back together seamlessly. The core samples were weighed, the internal surfaces photographed, and CT scans of the cores were taken. The acid-generating compound weight was recorded and placed on the broken core surface, and the core was reassembled and held together by rubber bands. The core samples were then placed in a 90° C. hot water bath and left for 1 to 2 hours at atmospheric pressure. At that time the cores were removed and disassembled, the internal surfaces were photographed, and CT scans of the cores were taken FIGS. 2A,B show an image of the internal portions of the fractured cores before (2A) and after (2B) treatment with $AlCl_3$. Darker areas in the photograph on the right indicate a change in the texture of the surface of the core after reacting with $AlCl_3$.

Figure 3A:
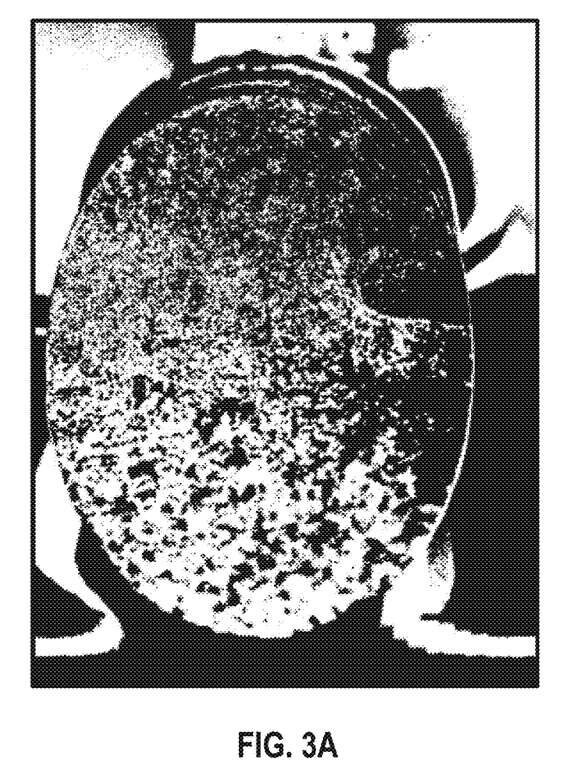
FIGS. 3A,B show images processed with an image threshold of the treated and untreated surfaces of cores.
Figure 3B:
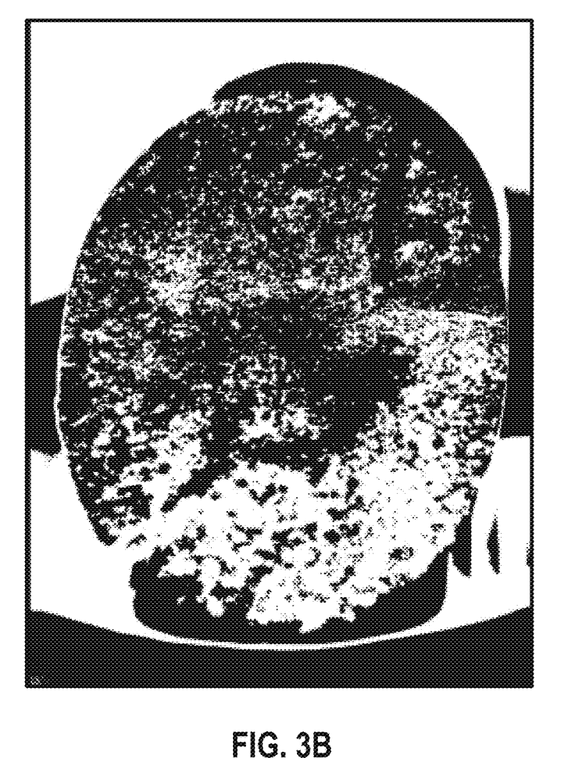

FIGS. 3A,B show images of the treated and untreated surfaces of the cores and were processed with an image threshold to observe pitting or areas of deeper regions in the surface of the core. The images highlight changes in the surface of the fracture before (3A) and after (3B) it was treated with $AlCl_3$. Darker areas in the picture indicate deeper pores or regions of erosion of the surface as a result of chemical action on the fracture.

Figure 4A:
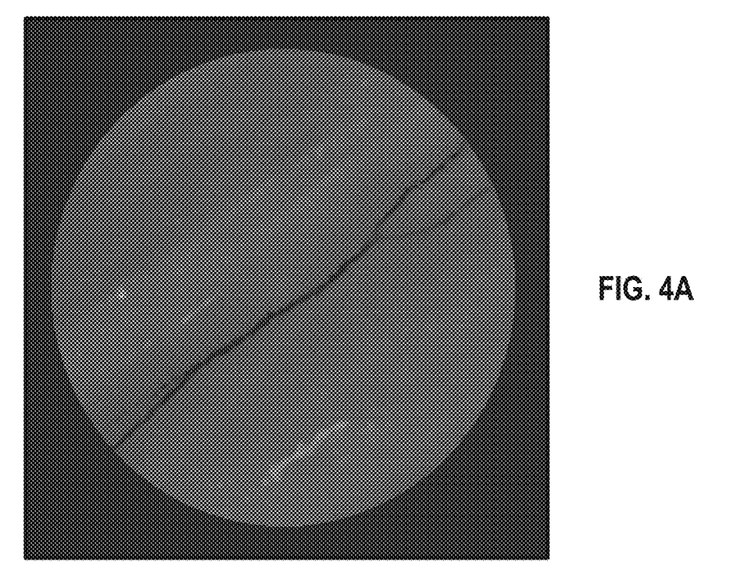
FIGS. 4A,B are CT scans of the cores taken before and after treatment with $AlCl_3$.
Figure 4B:
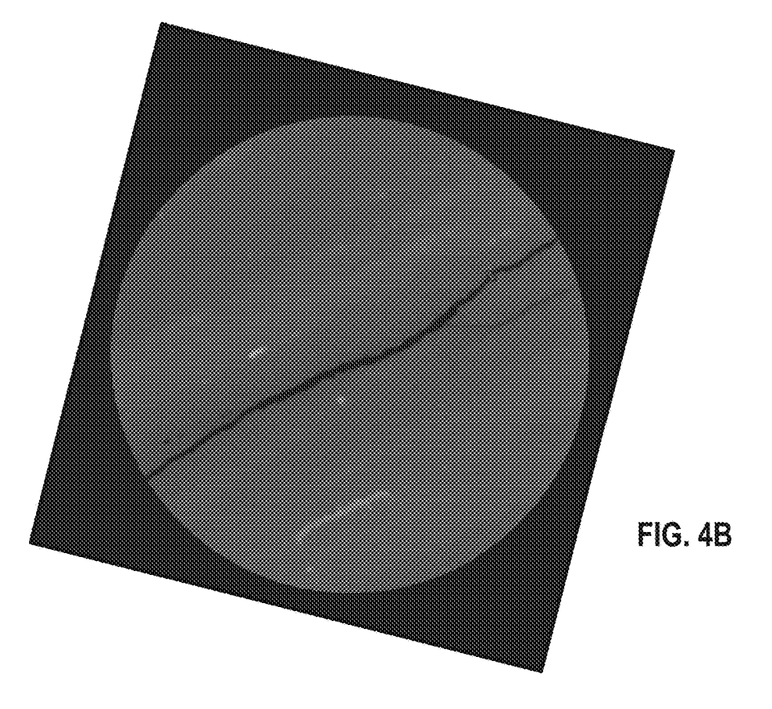

FIGS. 4A,B are CT scans of the cores taken before and after treatment with $AlCl_3$. Images of various sections of the core were further analyzed to determine changes in the width and height of primary fractures and secondary fractures before (4A) and after (4B) treatments. The measurements of the sections are shown in Table 1. The results show that on average, the widths of primary and secondary fractures were increased by about 36 percent.

Figure 5A:
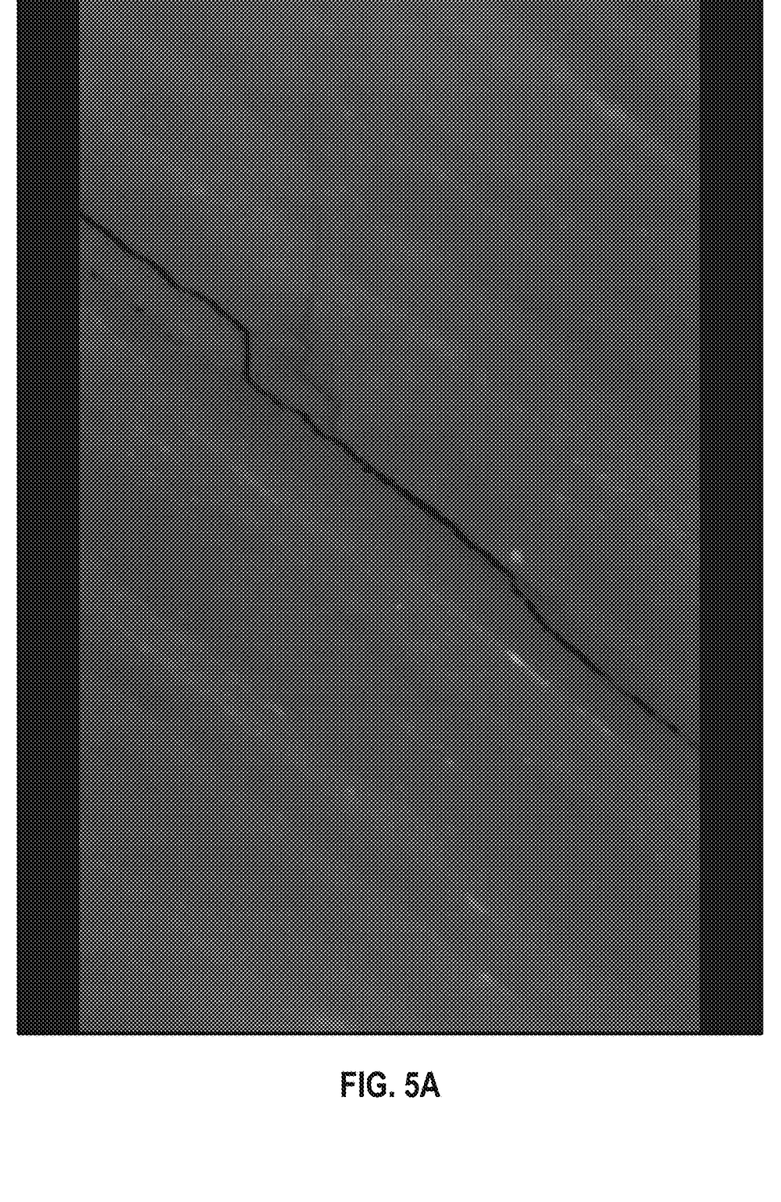
FIGS. 5A,B are CT scans of the cores taken before and after treatment with $AlCl_3$.
Figure 5B:
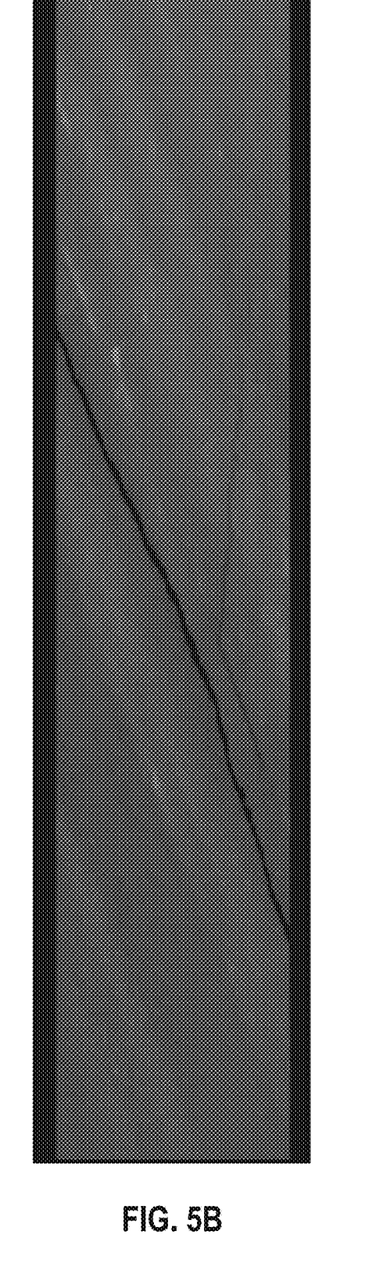

Analysis of the longitudinal section of the cores are shown in FIGS. 5A,B. Longitudinal sections of CT scan of shale core before (5A) and after treatment (5B) with $AlCl_3$. The images show increased height of the secondary fractures of the treated cores. Details of the measurement are shown in Table 1.

precursor, and mixtures thereof, with a carrier fluid, placing the capsules and the carrier fluid into a zone in a shale formation, said zone comprising fractures, allowing the capsules to at least partially dissolve, allowing the at least one of acid, Lewis acid, and hydrolysable acid precursor to hydrolyze, and etching the faces of at least one of fractures.

B: A method comprising: hydraulically fracturing a subterranean formation to produce a fractured formation having at least one fracture face, injecting capsules comprising at least one of a mineral acid, a Lewis acid, a hydrolysable acid precursor, and mixtures thereof into said fractured formation while maintaining hydraulic pressure on said fractured formation, depositing said capsules in said fractured formation, allowing at least a portion of the capsules to degrade or fracture, thereby releasing at least one of said mineral acid, Lewis acid, hydrolysable acid precursor, and mixtures thereof from said capsules, and allowing at least one of said mineral acid, Lewis acid, hydrolysable acid precursor, and mixtures thereof to hydrolyze, thereby acid etching said fracture face.

C: A method of treating a wellbore in a subterranean formation comprising: combining an insoluble matrix comprising at least one of a mineral acid, a Lewis acid, a hydrolysable acid precursor, and mixtures thereof, with a carrier fluid, placing the matrix and the carrier fluid into a zone in a shale formation, said zone comprising fractures, allowing the matrix to at least partially degrade, allowing the at least one of acid, Lewis acid, and hydrolysable acid precursor to hydrolyze, and etching the faces of at least one of fractures.

D: A well treatment system comprising: a well treatment apparatus configured to: inject capsules comprising at least one of a mineral acid, a Lewis acid, a hydrolysable acid precursor, and mixtures thereof into a fractured subterranean formation while maintaining hydraulic pressure on said fractured formation, deposit said capsules in said fractured formation, allow at least a portion of the capsules to degrade or fracture, thereby releasing at least one of said mineral acid, Lewis acid, hydrolysable acid precursor, and mixtures thereof from said capsules, and allowing at least one of said mineral acid, Lewis acid, hydrolysable acid precursor, and mixtures thereof to hydrolyze, thereby acid etching said fracture face.

Each of embodiments A, B, C and D may have one or more of the following additional elements in any combina-

TABLE 1

|  | Width of Secondary Fracture Before Treatment (µm) | Width of Secondary Fracture After Treatment (µm) | Width of Primary Fracture Before Treatment (µm) | Width of Primary Fracture After Treatment (µm) | Height of Secondary Fracture Before Treatment (cm) | Height of Secondary Fracture Before Treatment (cm) |
|---|---|---|---|---|---|---|
|  | 140 | 240 | 332 | 283 | 1.57 | 1.72 |
|  | 240 | 279 | 331 | 425 |  |  |
|  | 133 | 234 | 248 | 443 |  |  |
|  | 202 | 220 | 198 | 350 |  |  |
| Avg. | 178.8 | 243.3 | 277.3 | 375.3 | 1.6 | 1.7 |
| Avg. Increase |  | 64.5 |  | 98 |  | 0.15 |
| % Increase |  | 36 |  | 35 |  | 10 |

Embodiments disclosed herein include:

A: A method of treating a wellbore in a subterranean formation comprising: combining capsules comprising at least one of a mineral acid, a Lewis acid, a hydrolysable acid tion: Element 1: wherein the etching results in the formation of at least one of channels, gaps, or combinations thereof, between the fracture faces. Element 2: wherein the hydrolysable acid precursor is selected from titanium chloride, zirconium oxychloride, ammonium chloride, ammonium fluoride, trifluoromethanesulfonic acid, Faujasite zeolite, and combinations thereof. Element 3: wherein the hydrolysable acid precursor comprises disodium titanium chloride, trifluoromethanesulfonic acid, or Faujasite zeolite. Element 4: wherein the Lewis acid is selected from $BF_3$, $AlCl_3$, $FeCl_2$, $MgCl_2$, $ZnCl_2$, $SnCl_2$, and $CuCl_2$, and combinations thereof. Element 5: wherein the mineral acid comprises at least one of hydrochloric acid, nitric acid, sulfuric acid, phosphoric acid, boric acid, hydrofluoric acid, hydrobromic acid, perchloric acid, and combinations thereof. Element 6: wherein the capsule comprises a water soluble degradable polymer to encapsulate at least one of said mineral acid, Lewis acid, hydrolysable acid precursor, and mixtures thereof. Element 7: wherein the polymers are at least one selected from phenyl formaldehyde, lactone styrene derivatives, precipitated silica, elastomers, polyvinylidene chloride (PVDC), nylon, waxes, polyurethanes, cross-linked partially hydrolyzed acrylics, and combinations thereof. Element 8: wherein the capsules encapsulate the at least one of acid, Lewis acid, and hydrolysable acid precursor in a degradable material. Element 9: wherein the degradable material is a hydrolysable material that delays the hydrolyzing of the at least one of acid, Lewis acid, and hydrolysable acid precursor. Element 10: wherein the acid concentration, when in place, may be in the range of about 5% to about 20% by weight of the treatment fluid.

Element 11: wherein the etching results in the formation of at least one of channels, gaps, or combinations thereof, between the fracture faces. Element 12: wherein the matrix comprises at least one of polylactic acid, polyglycolic acid, poly(hydroxy alkanoate) (PHA); poly(alpha-hydroxy) acids, polylactide, and polyglycolide; poly(beta-hydroxy alkanoates); poly(omega-hydroxy alkanoates); poly(alkylene dicarboxylates), polyanhydrides; poly(orthoesters); polycarbonates; aliphatic polyesters; poly(lactides); poly(glycolides); poly(ε-caprolactones); poly(hydroxybutyrates); poly(an hydrides); aliphatic polycarbonates; poly(orthoesters); poly(amino acids); poly(ethylene oxides); polyphosphazenes, and mixtures thereof that incorporates the at least one of said mineral acid, Lewis acid, and hydrolysable acid precursor. Element 13: wherein the matrix degrades due to closure pressure in the formation, thereby gradually releasing the at least one of said mineral acid, Lewis acid, and hydrolysable acid precursor into the zone.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating a wellbore in a subterranean formation comprising:
   combining capsules comprising a hydrolysable acid precursor, with a carrier fluid;
   placing the capsules and the carrier fluid into a zone in a shale formation, said zone comprising fractures;
   allowing the capsules to at least partially dissolve releasing the hydrolysable acid precursor into the carrier fluid;
   allowing the hydrolysable acid precursor to hydrolyze thereby producing an acid; and
   allowing the acid to etch the faces of at least one of fractures.

2. The method of claim 1, wherein the etching results in the formation of at least one of channels, gaps, or combinations thereof, between the fracture faces.

3. The method of claim 1, wherein the hydrolysable acid precursor is selected from titanium chloride, zirconium oxychloride, ammonium chloride, ammonium fluoride, trifluoromethanesulfonic acid, Faujasite zeolite, and combinations thereof.

4. The method of claim 3, wherein the hydrolysable acid precursor comprises disodium titanium chloride, trifluoromethanesulfonic acid, or Faujasite zeolite.

5. The method of claim 1, wherein the capsule comprises a water soluble degradable polymer to encapsulate said hydrolysable acid precursor.

6. The method of claim 5, wherein the polymers are at least one selected from phenyl formaldehyde, lactone styrene derivatives, precipitated silica, elastomers, polyvinylidene chloride (PVDC), nylon, waxes, polyurethanes, cross-linked partially hydrolyzed acrylics, and combinations thereof.

7. The method of claim 1, wherein the capsules encapsulate said hydrolysable acid precursor in a degradable material.

8. The method of claim 7, wherein the degradable material is a hydrolysable material that delays the hydrolyzing of said hydrolysable acid precursor.

9. A method comprising:
   hydraulically fracturing a subterranean formation to produce a fractured formation having at least one fracture face;
   injecting capsules comprising a hydrolysable acid precursor into said fractured formation while maintaining hydraulic pressure on said fractured formation;
   depositing said capsules in said fractured formation;
   allowing at least a portion of the capsules to degrade or fracture, thereby releasing said hydrolysable acid precursor from said capsules; and
   allowing said hydrolysable acid precursor to hydrolyze thereby producing an acid,
   allowing the acid to thereby perform acid etching in said fracture face.

10. The method of claim 9, wherein the etching results in the formation of at least one of channels, gaps, or combinations thereof, between the fracture faces.

11. The method of claim 9, wherein the hydrolysable acid precursor is selected from titanium chloride, zirconium oxychloride, ammonium chloride, ammonium fluoride, trifluoromethanesulfonic acid, Faujasite zeolite, and combinations thereof.

12. The method of claim 11, wherein the hydrolysable acid precursor comprises disodium titanium chloride, trifluoromethanesulfonic acid, or Faujasite zeolite.

13. A method of treating a wellbore in a subterranean formation comprising:
   combining a matrix with a carrier fluid, wherein the matrix comprises a water-soluble degradable polymer that incorporates a hydrolysable acid precursor;

placing the matrix and the carrier fluid into a zone in a shale formation, said zone comprising fractures;
allowing the matrix to at least partially degrade;
allowing said hydrolysable acid precursor to hydrolyze thereby producing an acid; and
allowing the acid to etch the faces of at least one of fractures.

14. The method of claim 13, wherein the water-soluble degradable polymer comprises at least one of polylactic acid, polyglycolic acid, poly(hydroxy alkanoate) (PHA); poly(alpha-hydroxy) acids, polylactide, and polyglycolide; poly(beta-hydroxy alkanoates); poly(omega-hydroxy alkanoates); poly(alkylene dicarboxylates), polyanhydrides; poly(orthoesters); polycarbonates; aliphatic polyesters; poly(lactides); poly(glycolides); poly($\varepsilon$-caprolactones); poly(hydroxybutyrates); poly(anhydrides); aliphatic polycarbonates; poly(orthoesters); poly(amino acids); poly(ethylene oxides); polyphosphazenes, and mixtures thereof.

15. The method of claim 14, wherein the matrix degrades due to closure pressure in the formation, thereby gradually releasing said hydrolysable acid precursor into the zone.

16. A well treatment system comprising:
a well treatment apparatus configured to:
inject capsules comprising a hydrolysable acid precursor into a fractured subterranean formation while maintaining hydraulic pressure on said fractured formation;
deposit said capsules in said fractured formation;
allow at least a portion of the capsules to degrade or fracture, thereby releasing said hydrolysable acid precursor from said capsules; and
allow said hydrolysable acid precursor to hydrolyze producing an acid, thereby using the acid to perform acid etching of said fracture face.

* * * * *